(12) United States Patent
Mercurio et al.

(10) Patent No.: US 7,831,207 B2
(45) Date of Patent: Nov. 9, 2010

(54) FLASH PAIRING BETWEEN BLUETOOTH DEVICES

(75) Inventors: Gregory Scott Mercurio, Campbell, CA (US); Cullen Jennings, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 621 days.

(21) Appl. No.: 11/865,266

(22) Filed: Oct. 1, 2007

(65) Prior Publication Data

US 2009/0088076 A1    Apr. 2, 2009

(51) Int. Cl.
    *H04B 7/00*    (2006.01)
(52) U.S. Cl. .................. 455/41.2; 455/39; 455/41.3; 455/566; 455/158.4
(58) Field of Classification Search ............. 455/41.2, 455/410, 411, 39, 41.3, 566, 90.3, 157.2, 455/158.4, 158.5
    See application file for complete search history.

(56) References Cited

U.S. PATENT DOCUMENTS 6,722,331 B2    4/2004    Koehler et al.

2005/0232187 A1*    10/2005    Haller et al. ................. 370/328
2006/0116107 A1*    6/2006    Hulvey ........................ 455/411
2008/0172339 A1*    7/2008    Cato et al. ..................... 705/71

FOREIGN PATENT DOCUMENTS

WO    WO2004/088960    10/2004

OTHER PUBLICATIONS

Preliminary Report on Patentability and Written Opinion of the International Search Authority for Application No. PCT/US2008/077610 dated Apr. 15, 2010.
Long et al: "Human Perceivable Authentication: An Economical Solution for Security Associations in Short-Distance Wireless Networking" (Aug. 1, 2007), IEEE, PI, pp. 257-264.
Bluetooth Special Interest Group "Simple Pairing Whitepaper"; Aug. 3, 2006; pp. 1-23.

* cited by examiner

*Primary Examiner*—Tuan A Pham
(74) *Attorney, Agent, or Firm*—Tucker Ellis & West LLP

(57) ABSTRACT

In an example embodiment, a technique that allows a device unable to display a confirmation value and/or unable to receive a keyed data entry to confirm a generated confirmation value with a confirmation value produced by a second device. The confirmation value is output one character at a time. For example, for performing a six digit numerical comparison (NC), each digit is presented one at a time enabling a user to compare the output digit with the corresponding digit output by the second device.

19 Claims, 3 Drawing Sheets

US 7,831,207 B2

FLASH PAIRING BETWEEN BLUETOOTH DEVICES

TECHNICAL FIELD

This application is generally related to wireless communications.

BACKGROUND

Bluetooth® is an industrial specification for wireless personal area networks (PANs). Bluetooth® provides a way to connect and exchange information between devices such as mobile phones, laptops, PCs, printers, digital cameras, and video game consoles over a globally unlicensed short-range radio frequency. The Bluetooth specifications are developed and licensed by the Bluetooth Special Interest Group. The Bluetooth Special Interest Group defines a procedure called "Pairing" that is used to securely associate a first specific Bluetooth compatible device (such as a headset) with a second specific Bluetooth compatible device (such as a phone) to ensure privacy and security on the wireless communication link. This pairing procedure is typically only done once, however, pairing can be done multiple times and with multiple devices.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

Described herein is a technique that enables a device that is unable to display an entire confirmation value and/or receive a keyed entry of the confirmation value to confirm the confirmation value with a confirmation value produced by a second device. The entire confirmation value is output one character at a time. A user can verify the output character matches the corresponding character of the confirmation value generated by the second device.

In accordance with an example embodiment, there is disclosed herein, an apparatus, comprising a wireless transceiver, an output device, an input device and control logic in data communication with the wireless transceiver, the output device and the input device. The control logic is configured to generate a confirmation value comprising a plurality of characters responsive to associating with a second wireless device via the wireless transceiver. The control logic is further configured to output the plurality of characters of the confirmation value one character at a time and wait for confirmation for each of the plurality of characters via the input device. The control logic is configured to continue an association procedure with the second wireless device responsive to confirmation of all of the plurality of characters.

In accordance with an example embodiment, there is described herein a method comprising initiating a session with a second wireless device. A confirmation value comprising a plurality of characters is generated. Each of the plurality of characters are output one character at a time. An input is received confirming the outputted character is valid. The session with the second wireless device is validated responsive to receiving an input confirming all of the plurality of characters are valid.

In accordance with an example embodiment, there is described herein apparatus comprising means for initiating a session with a second wireless device and means for generating a confirmation value comprising a plurality of characters. The apparatus further comprises means for outputting the plurality of characters one character at a time and means for receiving an input confirming a currently output character is valid.

BRIEF DESCRIPTION OF THE DRAWINGS

The accompanying drawings incorporated herein and forming a part of the specification illustrate the examples embodiments.

DESCRIPTION OF EXAMPLE EMBODIMENTS

Figure 1:
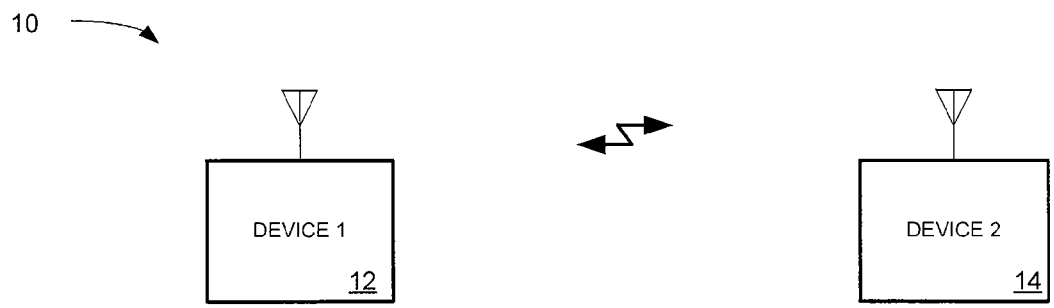
FIG. 1 illustrates an example of two devices configured to establish a personal area network connection.

This description provides examples not intended to limit the scope of the appended claims. The figures generally indicate the features of the examples, where it is understood and appreciated that like reference numerals are used to refer to like elements.

The Bluetooth specification includes various authentication methods to ensure that the joining of two pairing devices are indeed legitimate and not a device of an attacker or eavesdropper. One of the authentication methods is called "Numeric Comparison" (NC). With this method, a user must visually compare a six digit number on BOTH Bluetooth devices. A simple man-in-the-middle attack will result in the two 6-digit display values being different with probability 0.999999. The six digit numbers are compared on BOTH Bluetooth devices to avoid a man-in-the-middle attack. This can be accomplished via a simple and secure out-of-band way separate from the wireless communication link. If the numbers being compared by the user are the same, then the pairing of the devices was performed securely and the user can accept the pairing process as legitimate.

Described herein is a technique for protecting a connection between a pair of wireless devices establishing a session between each other has not been compromised by a man in the middle (MITM) attack. FIG. 1 illustrates an example embodiment 10 of two wireless devices 12, 14 configured to establish a connection (pairing) with each other via their wireless transceivers. Embodiment 10 will be explained with reference to the Bluetooth specification; however, the principles described herein are suitably adaptable to any wireless protocol using a numerical (or character) comparison technique and thus the principles described herein should not be construed as limited to Bluetooth compatible devices.

In an example embodiment, each device 12, 14 generate a public key/private key pair. The public key/private key pair can be generated by any suitable algorithm such as Elliptic Curve Diffie-Hellman (ECDH). The key pair may be generated once and computed in advance of pairing; however, a device may at any time choose to discard its public key/private key pair and generate a new pair.

In a Bluetooth compatible environment, one of devices 12, 14 initiate a connection with the other device. This could occur when a first device (the initiating) device detects the second (hereinafter referred to as the 'responding') device or responsive to a predetermined criterion. For example, when device 12 detects device 14, device 12 initiates the session. Device 12 is referred to as the initiator and device 14 as the responder, and the session between devices 12, 14 is referred to as a pairing.

Once a pairing, is initiated, device 12 that is initiating the pairing sends its public key to the responding device, device 14. Device 14 replies with its own public key. The public keys are not regarded as secret although they may identify the devices. The devices may also generate and exchange nonces.

As part of the authentication process, each device 12, 14 generates a confirmation value. In an example embodiment, the confirmation values are based on the exchanged public keys and nonces. In an example embodiment, a numerical computation (NC) technique is employed to verify the numbers match. For example, Bluetooth devices would generate a six digit confirmation number. Each device 12, 14 displays the confirmation value. A user (not shown) of devices 12, 14 then verifies that each device 12, 14 is displaying the same value. If the values match, the user selects (activates) a button designated as the accept button on each of devices 12, 14 and establishment of the session continues. If the values do not match, the user provides an input into devices 12, 14 indicating the devices do not match and the process aborts.

A problem can arise when one device does not have a typical keyboard for input or a display suitable to output the entire confirmation value. For example a typical Bluetooth audio headset only has three buttons and an LED Indicator. Two buttons are for volume up/down and the third is the answer button. Thus, the confirmation number cannot be displayed or keyed in via conventional methods.

An aspect of an example embodiment described herein provides the ability for devices lacking a keyboard for input and/or a display for output to perform NC authentication. For example, device 12 can be a telephone, such as a desktop phone or a cell phone that has a typical alphanumeric key pad and a visual display for the user, and device 14 a typical Bluetooth audio headset with at least one button and an LED Indicator. An example embodiment described herein provides the ability to compare two six digit numbers on BOTH Bluetooth devices 12, 14. Since the Bluetooth headset does not have a display, a means to present the numbers to the user is provided. In an example Bluetooth embodiment, a technique is employed that shows the 6 digits on the display of the phone, and in a particular embodiment one digit at a time, enabling the user to compare with the same digit on the Bluetooth headset.

For example, if the confirmation number is "375627", each digit can be compared one at a time. So, on the phone 12, the first digit to compare with the Bluetooth headset could look like this: >3<75627.

The user then looks at the LED indicator on the Bluetooth headset 14 and verifies that the LED is displaying the correct digit. For example, the digit 3 is indicated by the LED blinking 3 times (½ second apart) and then a delay of 3 seconds. In an example embodiment, the LED blinks the current setting: 1 blink for 1, 2 blinks for 2 . . . 9 blinks for 9, etc.

Once the user has determined that the digit on the phone display matches the pulsing LED indicator digit on the headset, the user can acknowledge the comparison by pressing a designated accept button on phone 12 and a designated e.g. 'answer' button on headset 14.

The subsequent digits are compared and acknowledged using the same technique just set forth. After all 6 digits are compared successfully the pairing process is complete.

Below there is illustrated an example where device 12 is a telephone and device 14 is a headset and the 6 digit number is 375627

| Iteration | Phone 12<br>Phone 12 display | Bluetooth headset 14<br>LED blink sequence |
|---|---|---|
| 1 | >3 < 75627 | 3 |
| 2 | 3 > 7 < 5627 | 7 |
| 3 | 37 > 5 < 627 | 5 |
| 4 | 375 > 6 < 27 | 6 |
| 5 | 3756 > 2 < 7 | 2 |
| 6 | 37562 > 7< | 7 |

The aforementioned NC method is simple and easy to use and does not require any knowledge of the cryptography (public key) or other numbers.

Although the example just illustrated employs one device with a numeric keypad and a display and a second device without a display or keypad, the principles described herein can be employed in embodiments where both devices lack a numeric keypad and/or display capable of outputting the entire confirmation value. Moreover, the principles just set forth are not limited to numeric only embodiments as corresponding values can also be assigned to alpha and other characters as well. For example, a system employing a hexadecimal notation may use 10 blinks to represent the letter "A", 11 blinks to represent the letter "B", etc.

Moreover, the type of output provided by a device that does not have a display is not limited to just LED flashes. For example, in an example embodiment, device 14 may have a display that can only display one character (or digit) at a time. In another example embodiment, device 14 may comprise a light emitting device other than a light emitting diode.

In another example embodiment, device 14 has an audio module. The audio module provides an audio output representative of the character. For example, the audio module may suitably comprise a text to speech (TTS) module that provides an audio output representative of the character, for example a voice simulation.

In another example embodiment, the audio module comprises a tone generating circuit. The tone generating circuit is responsive to emit a predefined number of tones (beeps) corresponding to the character.

In another example embodiment, device 14 is capable of vibrating. Any circuit or device capable of causing device 14 to vibrate is suitable. The vibrating circuit is responsive to vibrate a predefined number of times corresponding to the character.

In an example embodiment, device 14 has only one input (button). A user can confirm a character by activating the input (button) a first predetermined number of times within a predefined time period (for example once within three seconds) and to reject a character by activating the input (button) a second predetermined number of times within the predefined time period (for example twice within three seconds).

Figure 2:
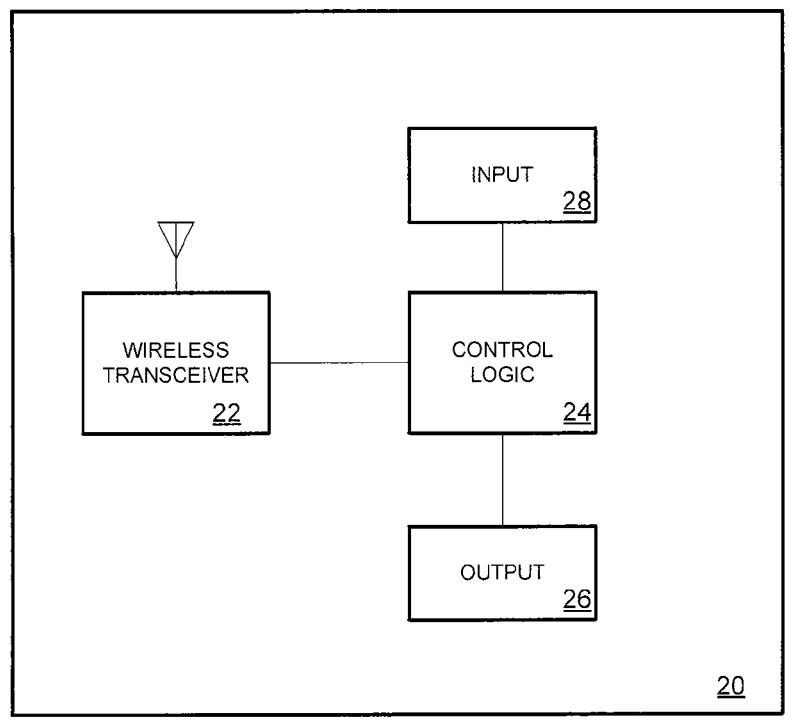
FIG. 2 illustrates an example of a device configured to validate a connection with limited input/output resources.

FIG. 2 illustrates an example of a device 20 configured to validate a connection with limited input/output resources. Device 20 is suitable to implement either of devices 12, 14 illustrated in FIG. 1.

Device 20 comprises a wireless transceiver 22. Wireless transceiver is any suitably wireless transceiver capable of receiving wireless signals. Wireless signals include, but are not limited to radio frequency (RF), infrared (IR) and optical signals.

Control logic 24 is in data communication with wireless transceiver 22. Control logic 24 is configured to receive data via wireless transceiver 22 and can also transmit data via wireless transceiver 22. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

An output device 26 is in data communication with control logic 24. Output device 26 provides an interface for communicating data to a user. Control logic 24 can send data to output 26. Output 26 is suitably any type of output device capable of communicating data to a user associated with device 20. For example in an example embodiment output device 26 comprises a visual display configured to output a character provided by the control logic.

In another example embodiment, output device 26 comprises a light emitting device. Control logic 24 is configured to output a character by strobing the light emitting device a predefined number of times corresponding to the character. In particular embodiments, the light emitting comprises a light emitting diode (LED).

In an example embodiment, output device 26 comprises an audio module. Control logic 24 is configured to provide a character to the audio module for output, the audio module providing an audio output representative of the character. In particular embodiments, the audio module comprises a text to speech module. Control logic 24 is configured to provide a character to the text to speech module for output, the text to speech module providing an audio output representative of the character. The speech that is output may be pre-recorded sounds representative of the data or can be synthesized speech. In another particular embodiment, the audio module comprises a tone generating circuit. Control logic 24 is configured to provide a character to the tone generating circuit. The tone generating circuit is responsive to emit a predefined number of tones (such as beeps) corresponding to the character.

In an example embodiment, output device 26 comprises a vibrating circuit, such as are commonly found on portable electronic devices such as cell phones and pagers. Control logic 24 is configured to provide a character to the vibrating circuit for output. The vibrating circuit is responsive to vibrate a predefined number of times corresponding to the character.

Input 28 is also in data communication with control logic 24. Input 28 provides an interface to a user for entering data that is processed by control logic 24. In an example embodiment, input 28 comprises a button. As will be described herein, control logic 24 can be configured to respond to the number of times the button is pushed within a predetermined time period to enable a user to signal a positive or negative result. In another example embodiment, input 28 comprises a second button. Control logic 24 is configured to determine which button is pushed (or activated).

In operation, wireless transceiver 22 sends data to control logic 24 when it acquires a signal from another (second) wireless device. Device 20 is suitable to be configured as either an initiator or a responder for pairing. Control logic 24 may generate, or be configured with, a public/key private key pair for data communication. In an example embodiment, during the pairing process, control logic 24 receives a public key from the second device via wireless transceiver 22. Control logic 24 also sends a public key to the second device via wireless transceiver 22. In particular embodiments, control logic 24 may also generate a nonce that is also communicated with the second device and receive a nonce associated with the second device via wireless transceiver 22. Upon exchanging public keys, and optionally nonces, control logic 24 is configured to generate a confirmation value comprising a plurality of characters responsive to associating with a second wireless device via the wireless transceiver. In a particular embodiment, the confirmation value is a numeric value comprising a plurality of digits, for example in a Bluetooth compatible environment the confirmation value is a six digit number. In an alternate embodiment, the confirmation value can be greater than or less than six digits. The confirmation value can be generated based on the exchanged public keys, and optionally on exchanged nonces.

Control logic 24 is configured to output the plurality of characters of the confirmation value one character at a time to output 26 and wait for confirmation for each of the plurality of characters via input 28. Control logic 24 is configured to continue an association procedure with the second wireless device responsive to confirmation of all of the plurality of characters.

In an example embodiment, control logic 24 is further configured to discontinue the association procedure responsive to determining one of the plurality of characters does not match a corresponding character generated by the second wireless device. Control logic 24 may retry the connection. After a predetermined number of retries, control logic 24 may be configured to discontinue the pairing process. For example control logic 24 may discontinue the pairing process after three tries. Alternatively, control logic 24 can be configured to disable device 20 for a predetermined time period, e.g., several minutes or hours.

In an example embodiment, device 20 can be employed for implementing a Bluetooth headset for a telephone. Input 28 comprises a plurality of buttons. For example input 28 may include buttons for volume adjustment (one for up and one for down) and a button to answer a call or go off hook. Output 26 is a LED light, although other types of output devices described herein are also suitable. Control logic 24 then outputs the first number of the confirmation value by blinking the LED a predetermined number of times (for example one blink for '1', two blinks for '2', ... nine blinks for '9', etc.). Control logic 24 then waits for a response from the user received at input 28. For example, in a one button embodiment, pressing the button once will indicate a match whereas pressing the button twice indicates no match. For a two or more button embodiment, pressing one button (for example the answer button of the headset) indicates a match while pressing another button (for example a defined one or both of the volume buttons of the headset) indicates the output character does not match the corresponding character of the second device. Control logic 26 continues the process until all of the characters of the confirmation value have been verified. If all of the characters have been verifies, then pairing of the devices continues.

Figure 3:
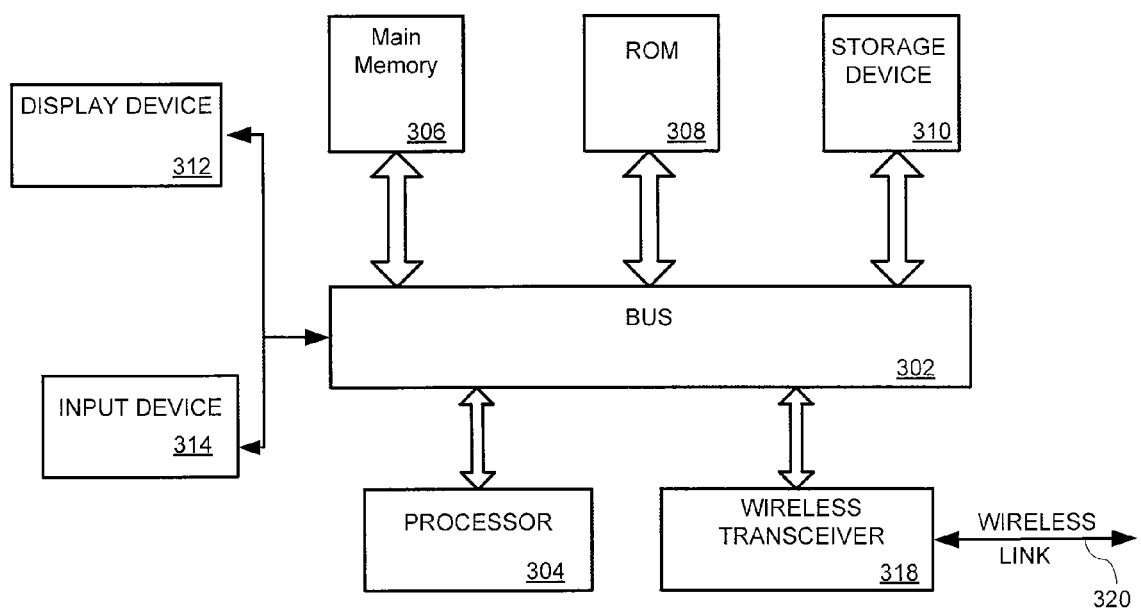
FIG. 3 is a computer system configured to implement an example embodiment.

FIG. 3 illustrates an example of a computer system 300 configured to implement an example embodiment. Computer system 300 is suitable for implementing devices 12, 14 (FIG. 1) and control logic 24 of device 20 (FIG. 2). Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to an output device 312. Output device 312 may provide visual output such as a cathode ray tube (CRT) or liquid crystal display (LCD), for displaying information to a computer user. Output device can also be an audio device that provides a sound output, such as a number of beeps are a voice/synthesized voice output. An input device 314, such as one or buttons is coupled to bus 302 for communicating information and command selections to processor 304.

An aspect of the example embodiment is related to the use of computer system 300 for flash pairing between Bluetooth devices. According to an example embodiment, flash pairing between Bluetooth devices is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

Computer system 300 also includes a wireless transceiver interface 318 coupled to bus 302. Wireless transceiver interface 318 provides a two-way data communication with other wireless devices. Wireless transceiver interface 318 sends and receives electrical, electromagnetic, or optical signals that carry digital data streams representing various types of information.

Communication link 320 typically provides data communication to other data devices. For example, network link 320 may provide a connection to a second device for flash pairing.

Figure 4:
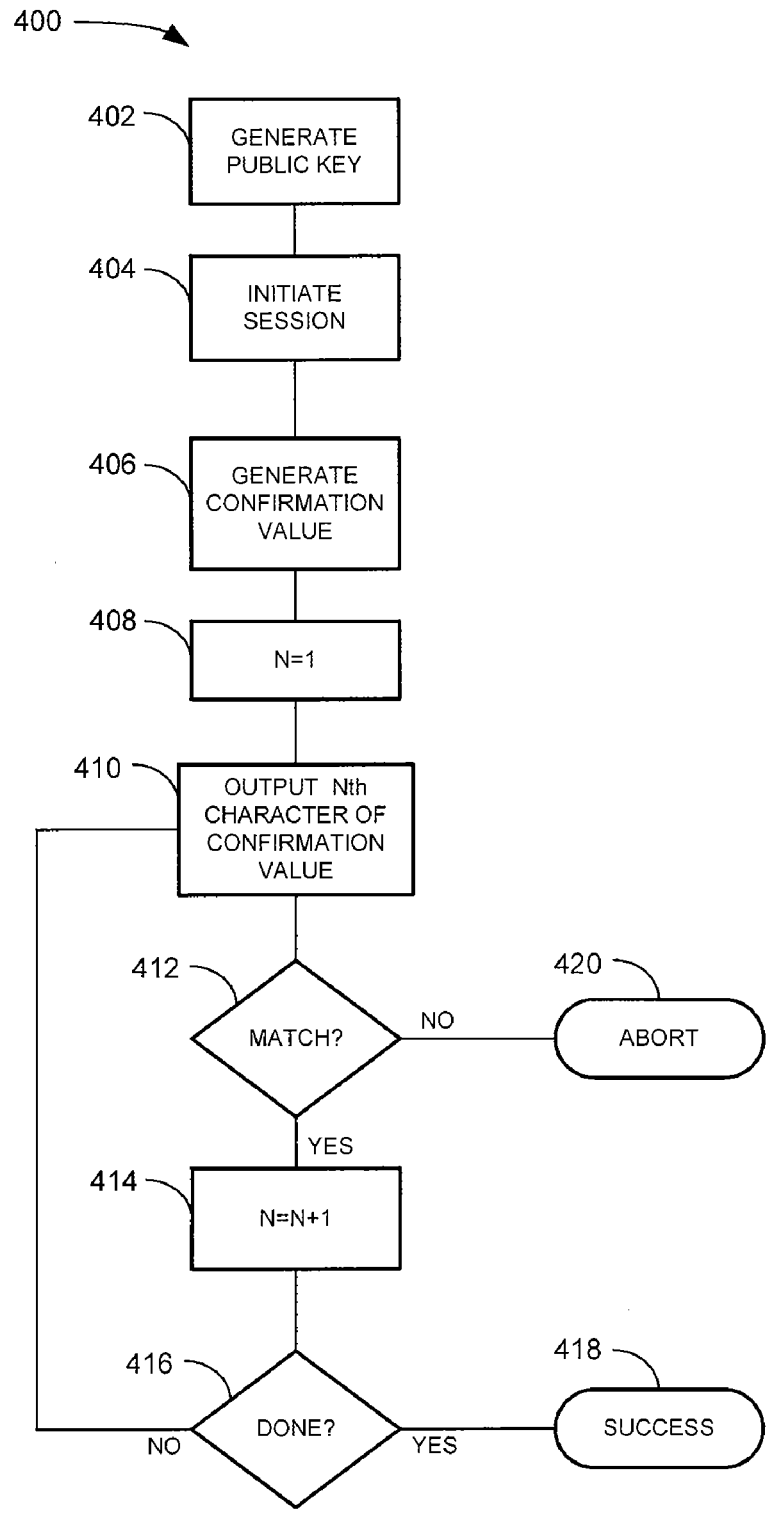
FIG. 4 illustrates an example methodology.

In view of the foregoing structural and functional features described above, a methodology 400 in accordance with an example embodiment will be better appreciated with reference to FIG. 4. While, for purposes of simplicity of explanation, the methodology of FIG. 4 is shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodology described herein is suitably adapted to be implemented in hardware, software, or a combination thereof.

At 402, a public key is generated. In an example embodiment, each device generates a pubic key/private key pair. The public key/private key pair can be generated by any suitable algorithm such as Elliptic Curve Diffie-Hellman (ECDH). The key pair may only be generated once and computed in advance of pairing. A device may at any time choose to discard its public key/private key pair and generate a new pair.

At 404, a session, for example a BLUETOOTH pairing, is initiated. A device initiating the session (or pairing) sends its public key to the receiving device. The responding device replies with its own public key. The public keys are not regarded as secret although they may identify the devices.

At 406, each device independently generates a confirmation value. In an example embodiment, a Numerical Comparison (NC) protocol is employed. After public keys have been exchanged, each device selects a pseudo-random number (for example a 128 bit nonce). The pseudo-random number is used to prevent replay attacks and should be freshly generated with each instantiation of the pairing protocol.

The responding device computes a commitment to the two pubic keys that were exchanged and its own nonce value. This commitment is computed as a one-way function of the public key values and its own nonce value and is transmitted to the initiating device. This commitment prevents an attacker from changing these values at a later time. The initiating and responding devices then exchange their respective nonce values and the initiating device confirms the computed commitment. Assuming the commitment check succeeds, two devices each generate a 6-digit confirmation value. Although the example embodiment illustrate employs a 6-digit confirmation value, an alternate embodiment contemplates the confirmation value may suitably comprise alphanumeric or any type of character data.

At 408, a counter or pointer is initialized. This is to start the procedure of outputting one character (or digit) at a time. The counter, or pointer, is initialized to point to the first character (or digit) of the confirmation value. In the illustrated example, the variable N is used to indicate which character (or digit) is being output.

At 410, the Nth (or current) character, or digit, which the first time through would be the first value, of the confirmation value is output. As described herein, there are many possible ways in which the Nth character may be output. For example, if the device has a visual output, such as a light or LED, the light or LED may be strobed (flashed) a number of times corresponding to the character. For example, if the character is a digit, the light or LED may be flash a number of times that correspond with the value of the digit. As another example, if the device has an audio output, the device may output a number of tones, e.g. beeps, corresponding to the Nth character. In yet another example embodiment, if the device is equipped with a text to speech module, a spoken value of the character may be output. In still yet another embodiment, the output device vibrates a predetermined number of times that correspond to the value of the Nth character.

The output may be repeated. For example, after a three second delay an LED may again flash the value of the Nth (current) character (digit). Any suitable delay length is acceptable.

At 412, an input is received that indicates whether the current (Nth) character matches the corresponding character output by the second device. For devices that have a keypad (either digital or alphanumeric), the value of the second device can be input and a determination can be made whether there is a match.

For devices that do not have a keypad, such as a headset that has two volume control buttons (one to increase volume and the other two decrease volume) and an answer button, one input (button) can be designated as an accept button for a user to activate (press) for verifying the Nth character and another input (button) can be designated as a reject button for a user to activate (press) if the Nth character does not match the corresponding character output by the second device. In an example embodiment, where only one input (button) is available, a predetermined number (one) of activations (pressing of the button) can indicate the value matches while another predetermined number of activations (two) of the button can indicate the Nth value does not match the corresponding value output by the second device. In an example embodiment, failure to receive a response within a predetermined time period can be equated as no match.

If at 412, there was not a match (NO), methodology 400 aborts. In an example embodiment, the devices attempt another connection. In particular embodiments, a predetermined number of re-connections are attempted. In an example embodiment, if a successful connection is not made within a predetermined number of re-connections, the device automatically shuts down (deactivates). The device may shut down for a predetermined time period, e.g. a few minutes or hours, or the device may deactivate until a user performs a predefined task to reactivate the device.

If at 412 there was a match (YES), at 414 the counter (or pointer) is incremented. This enables method 400 to output the next character (or digit) during the next iteration.

At 416, it is determined whether all of the characters (or digits) have been confirmed. If all of the characters (or digits) have been confirmed (YES), then the devices have successfully authenticated and methodology 400 stops at 418. If all of the characters have not been confirmed (NO) the next character is output at 410 and steps 412, 414 and 416 are repeated until all of the characters have been verified.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a wireless transceiver;
an output device;
an input device; and
control logic in data communication with the wireless transceiver, the output device and the input device
wherein the control logic is configured to generate a confirmation value comprising a plurality of characters responsive to associating with a second wireless device via the wireless transceiver;
wherein the control logic is configured to output the plurality of characters of the confirmation value one character at a time and wait for confirmation for each of the plurality of characters via the input device; and
wherein the control logic is configured to continue an association procedure with the second wireless device responsive to confirmation of all of the plurality of characters.

2. The apparatus of claim 1, wherein the control logic is further configured to discontinue the association procedure responsive to determining one of the plurality of characters does not match a corresponding character generated by the second wireless device.

3. The apparatus of claim 1, wherein the output device comprises a visual display configured to output a character provided by the control logic.

4. The apparatus of claim 3, wherein the output device comprises a light emitting device, the control logic is configured to output a character by strobing the light emitting device a predefined number of times corresponding to the character.

5. The apparatus of claim 4, wherein the light emitting device comprises a light emitting diode.

6. The apparatus of claim 1, wherein the output device comprises an audio module, the control logic is configured to provide a character to the audio module for output, the audio module providing an audio output representative of the character.

7. The apparatus of claim 6, wherein the audio module comprises a text to speech module, the control logic is configured to provide a character to the text to speech module for output, the text to speech module providing an audio output representative of the character.

8. The apparatus of claim 6, wherein the audio module comprises a tone generating circuit, the control logic is configured to provide a character to the tone generating circuit, the tone generating circuit is responsive to emit a predefined number of tones corresponding to the character.

9. The apparatus of claim 1, wherein the output device comprises a vibrating circuit, the control logic is configured to provide a character to the vibrating circuit for output, the vibrating circuit is responsive to vibrate a predefined number of times corresponding to the character.

10. The apparatus of claim 1, wherein the input device comprises a button.

11. The apparatus of claim 10, wherein the control logic is configured to confirm a character responsive to the button being activated a first predetermined number of times within a predefined time period and to reject a character responsive to the button being activated a second predetermined number of times within the predefined time period.

12. The apparatus of claim 10, wherein the input device comprises a second button, and wherein the control logic is responsive to confirm a character responsive to the button being activated and the control logic is configured to reject a character responsive to the second button being activated.

13. The apparatus of claim 1, wherein the control logic is configured to receive data representative of a key for the second device, and wherein the control logic is configured to derive the confirmation value from the data representative of the key.

14. A method, comprising:
   initiating a session with a wireless device;
   generating a confirmation value comprising a plurality of characters;
   outputting the plurality of characters of the confirmation value one character at a time and wait for confirmation for each of the plurality of characters via an input device;
   receiving an input confirming the each of the plurality of characters, one character at a time, is valid; and
   validating the session with the wireless device responsive to receiving an input confirming all of the plurality of characters are valid.

15. The method of claim 14, the outputting the plurality of characters one character at a time comprises flashing a light a predetermined number of times corresponding to the character being output.

16. The method of claim 14, the outputting the plurality of characters one character at a time comprises converting the character to a voice signal corresponding to the value of the character, and outputting the voice signal.

17. The method of claim 14, the outputting the plurality of characters one character at a time comprises generating a predetermined number of audio pulses corresponding to a character currently being output.

18. The method of claim 14, the outputting the plurality of characters one character at a time comprises vibrating a predetermined number of times corresponding to a character currently being output.

19. An apparatus, comprising:
   means for initiating a session with a wireless device;
   means for generating a confirmation value comprising a plurality of characters;
   means for outputting the plurality of characters of the confirmation value one character at a time and wait for confirmation for each of the plurality of characters via an input device;
   means for receiving an input confirming a currently output character is valid; and
   means for validating a connection with the second wireless device responsive to the means for receiving an input confirming that all of the plurality of characters are valid.

* * * * *